United States Patent
You

(10) Patent No.: US 7,082,914 B2
(45) Date of Patent: Aug. 1, 2006

(54) METHOD FOR CONTROLLING IDLE STOP-AND-GO SYSTEM

(75) Inventor: Sung Il You, Gwacheon (KR)

(73) Assignee: Hyundai Motor Company, Seoul (KR)

( * ) Notice: Subject to any disclaimer, the term of this patent is extended or adjusted under 35 U.S.C. 154(b) by 28 days.

(21) Appl. No.: 11/021,809

(22) Filed: Dec. 22, 2004

(65) Prior Publication Data

US 2005/0139182 A1    Jun. 30, 2005

(30) Foreign Application Priority Data

Dec. 30, 2003    (KR)    ...................... 10-2003-0100936

(51) Int. Cl.
  *F02N 11/08* (2006.01)
  *F02B 25/06* (2006.01)
(52) U.S. Cl. .............................. 123/179.4; 123/198 D
(58) Field of Classification Search ............ 123/179.4, 123/179.3, 198 D, 198 DB; 701/101, 111, 701/112, 114, 115
See application file for complete search history.

(56) References Cited

U.S. PATENT DOCUMENTS

| 5,117,218 | A | * | 5/1992 | Sasaki et al. ............... 180/271 |
| 5,619,412 | A | * | 4/1997 | Hapka ..................... 123/179.4 |
| 6,351,703 | B1 | * | 2/2002 | Avery, Jr. ................... 701/112 |
| 6,453,865 | B1 | * | 9/2002 | Hirose et al. ............. 123/179.4 |
| 6,532,926 | B1 | * | 3/2003 | Kuroda et al. ........... 123/179.4 |
| 2005/0103302 | A1 | * | 5/2005 | You ........................ 123/179.4 |
| 2005/0199209 | A1 | * | 9/2005 | Shimokawa et al. ..... 123/179.4 |

FOREIGN PATENT DOCUMENTS

| JP | 58015733 A1 | * | 1/1983 |
| JP | 58023231 A1 | * | 2/1983 |
| JP | 09-060548 | | 3/1997 |

* cited by examiner

*Primary Examiner*—Carl S. Miller
*Assistant Examiner*—Arnold Castro
(74) *Attorney, Agent, or Firm*—Morgan Lewis & Bockius LLP

(57) ABSTRACT

The method for controlling an idle stop-and-go system is based on one or more engine control modes, including a starting mode wherein an engine control unit (ECU) starts an engine by an engine stop release signal received from a starter/generator control unit (SCU), a normal mode for normally operating the engine, and an after-run mode wherein the ECU stops the engine based on an engine stop signal received from the SCU. Initially, it is determined whether a present engine control mode is the normal mode. Thereafter, it is determined whether an engine stop signal is received from the SCU. The engine control mode is then changed to the after-run mode whern the present engine control mode is the normal mode and an engine stop signal is received from the SCU. Finally, the engine warning lamp is blocked from illuminating.

3 Claims, 3 Drawing Sheets

US 7,082,914 B2

METHOD FOR CONTROLLING IDLE STOP-AND-GO SYSTEM

CROSS-REFERENCE TO RELATED APPLICATIONS

This application claims priority to Korean Application No. 10-2003-0100936, filed Dec. 30, 2003, the disclosure of which is incorporated herein by reference.

FIELD OF THE INVENTION

Generally, the present invention relates to a method for controlling an idle stop-and-go system.

BACKGROUND OF THE INVENTION

A typical idle stop-and-go system is a system for improving fuel efficiency by preventing unnecessary fuel consumption due to engine idling by stopping operation of an engine while a vehicle is not moving.

When the vehicle stops, the idle stop-and-go system automatically stops the engine several seconds later. Subsequently, in the case that a driver's intention to travel the vehicle is detected, for example, when a brake pedal is released or a gear is changed, the system automatically restarts the engine without operation of an ignition key.

Conventional idle stop-and-go systems have a problem in that an engine warning lamp is unnecessarily illuminated when an idle stop is released without operation of an ignition key.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

The present invention provides an idle stop-and-go system having non-limiting advantages of preventing an unnecessary illumination of an engine warning lamp.

An exemplary method for an idle stop-and-go system according to an embodiment of the present invention includes one or more engine control modes, including: a starting mode wherein an engine control unit (ECU) starts an engine by an engine stop release signal received from a starter/generator control unit (SCU); a normal mode for normally operating the engine; and an after-run mode, wherein the ECU stops the engine based on an engine stop signal received from the SCU. The method comprises: determining whether a present engine control mode is the normal mode; determining whether an engine stop signal is received from the SCU; changing the engine control mode to the after-run mode in the case that the present engine control mode is the normal mode and an engine stop signal is received from the SCU; and blocking the illumination of an engine warning lamp.

In a further embodiment, the method for controlling an idle stop-and-go system comprises: determining whether an engine stop releasing signal is received in the after-run mode; changing the engine control mode to the starting mode in the case that the engine stop releasing signal is received; determining whether an engine speed is above a predetermined speed; determining whether an elapsed time after the engine speed became above the predetermined speed is above a predetermined time in the case that the engine speed is above the predetermined speed; and releasing the blocking of the illumination of the engine warning lamp in the case that the elapsed time is above the predetermined time.

In another further embodiment, the predetermined speed is less than a critical speed for changing the engine control mode from the starting mode to the normal mode.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

Figure 1:
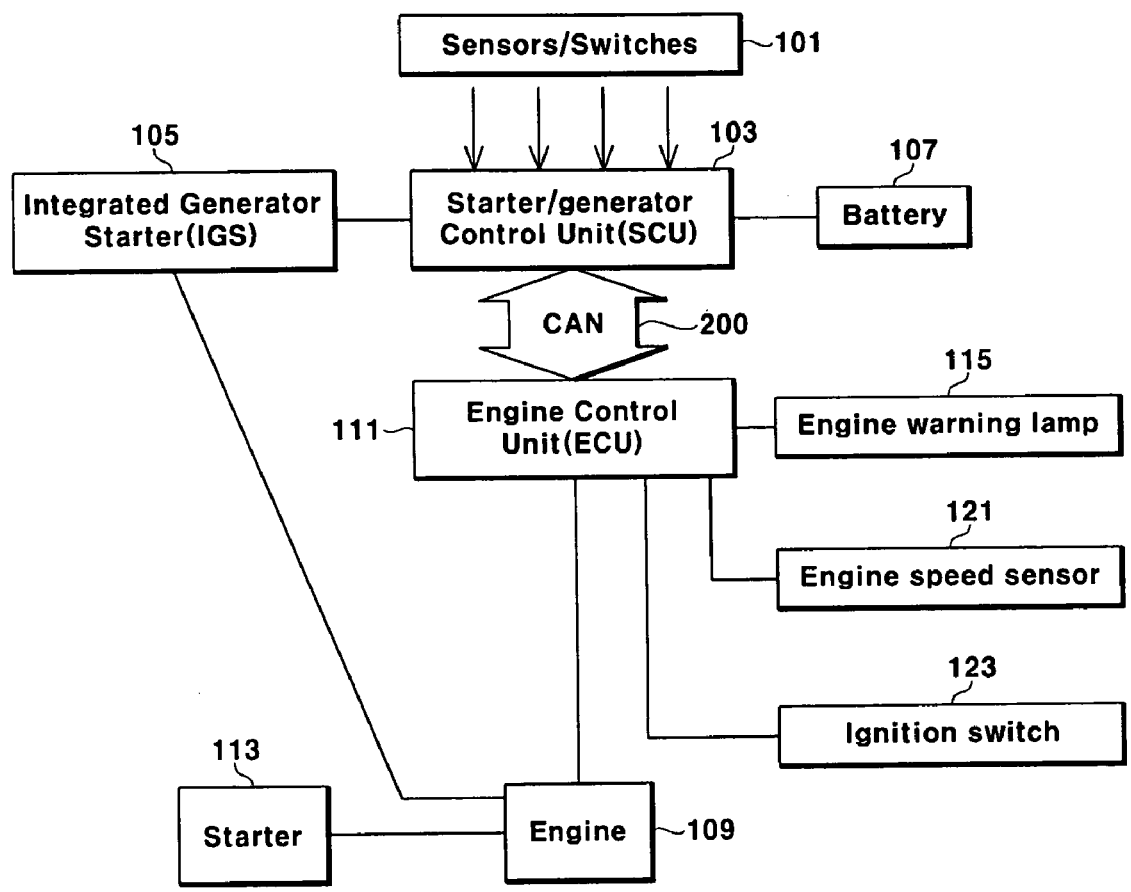
FIG. 1 is a schematic drawing showing an idle stop-and-go system according to an embodiment of the present invention.

FIG. 1 is a schematic drawing showing an idle stop-and-go system according to an embodiment of the present invention. As shown, according to an embodiment of the present invention, an idle stop-and-go system includes an engine control unit (ECU) 111 for controlling an engine 109, an integrated generator starter (IGS) 105 for starting the engine 109 and charging a battery 107, a starter/generator control unit (SCU) 103 for controlling the IGS 105, and one or more sensors and switches 101. The SCU 103 and the ECU 111 can be respectively realized by one or more processors activated by a predetermined program, and the predetermined program can be programmed to perform each step of a method according to an embodiment of this invention.

The SCU 103 and the ECU 111 are interconnected to each other through a network 200 such as a controller area network (CAN), to communicate various data with each other. The ECU 111 may be connected to an engine speed sensor 121 and an ignition switch 123 to receive signals therefrom. The engine speed sensor 121 detects an engine speed (rpm) and generates a corresponding engine speed signal, and the ignition switch 123 generates an ignition-on signal or an ignition-off signal corresponding to an operating position of an ignition key.

Hereinafter, a basic operating principal of the idle stop-and-go system according to an embodiment of the present invention is described. The IGS 105 can operate as both a starter to start the engine 109 and a generator to charge the battery 107, and may be driven by a belt. A determination of an idle stopping and going, i.e., a determination of an engine stop and an engine stop releasing is made primarily by the SCU 103 and auxiliarily by the ECU 111. That is, the SCU 103 determines whether an idle stop is needed or an idle stop release is needed and generates a corresponding engine control signal (i.e., an engine stop signal or an engine stop releasing signal), and the ECU 111 controls operations of the engine 109 based on the engine stop signal or the engine stop releasing signal received from the SCU 103.

An initial start of the engine 109 is performed by a conventional starter 113 to increase a start ability of the engine 109 in a cold circumstance, and a restart of the engine 109 by an idle stop release, i.e., an engine stop release is performed by the IGS 105. After the engine 109 has been started, then the IGS 105 automatically charges the battery 107.

The one or more sensors and switches 101 include a sensor for detecting on/off state of the engine 109 and generating a corresponding signal, a sensor for detecting whether a brake operates and generating a corresponding signal, a sensor for detecting a gear-shifting and generating a corresponding signal, and so forth. In addition, signals generated by the one or more sensors and switches 101 are transmitted to the SCU 103, and the SCU 103 may determine, on the basis of the transmitted signals, whether an idle stop is needed or an idle stop release is needed. Because an idle stop condition and the idle stop release condition are obvious to a person skilled in the art, a further explanation for the same will be omitted.

Figure 2:
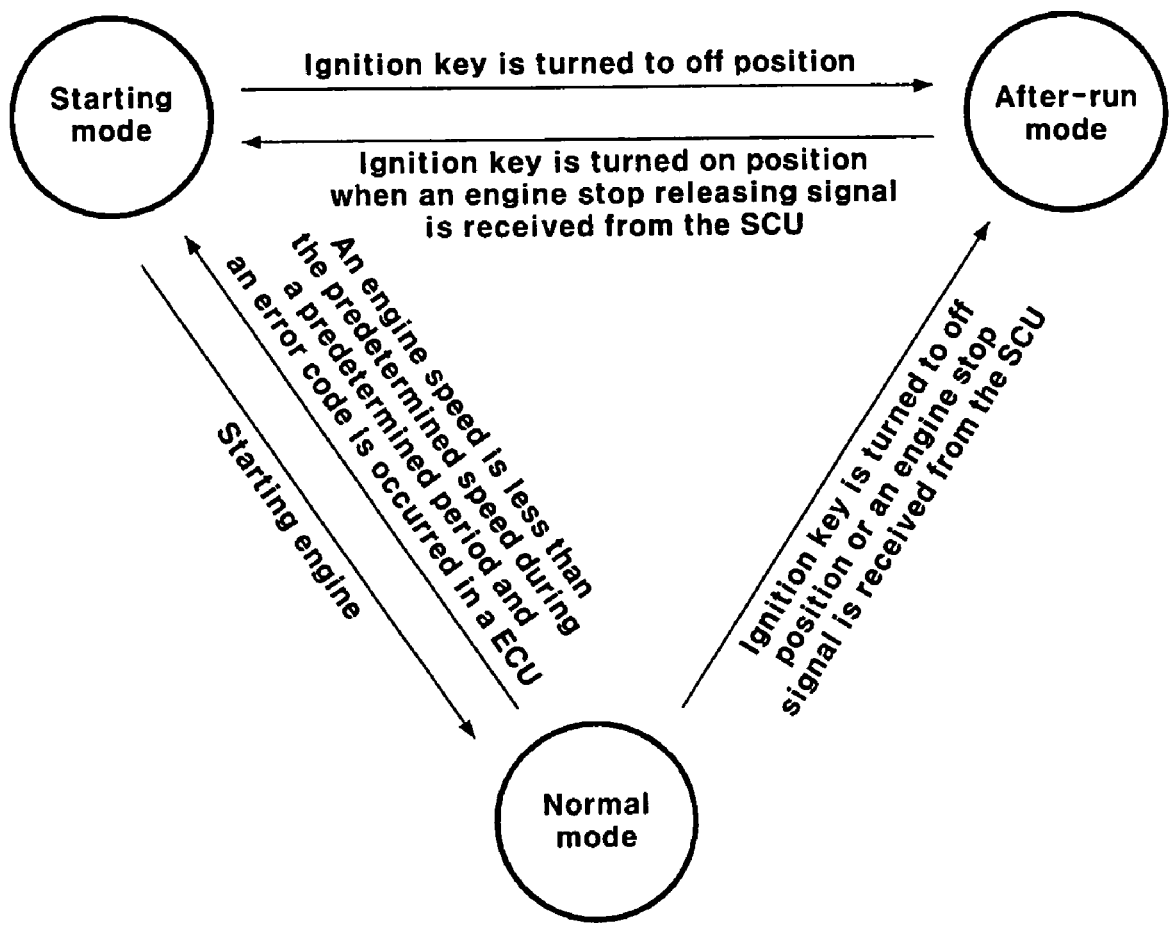
FIG. 2 is a drawing showing engine control modes for an idle stop-and-go system according to an embodiment of the present invention.

FIG. 2 is a drawing showing engine control modes for an idle stop-and-go method according to an embodiment of the present invention. The ECU 111 determines an integrated generator starter (IGS) control mode among predetermined engine control modes, on the basis of engine operating condition and the engine control signal received from the SCU 103. For example, the engine operating condition may include an engine speed that is detected by an engine speed signal input from the engine speed sensor 121, and as shown in FIG. 2, the predetermined engine control modes include a starting mode, a normal mode, and an after-run mode.

The engine 109 can normally be started in the starting mode. That is, in the starting mode, the IGS 105 is maintained in a state in which the IGS 105 can perform a function of a start motor. In the normal mode, the engine 109 operates normally. In addition, after the engine 109 is started, the SCU 103 detects an engine speed, and accordingly, it changes the engine control mode to the normal mode and charges the battery 107 automatically.

In the after-run mode, the ECU 111 performs control processes to stop the engine 107. Processes by which the engine control mode is changed from the normal mode to the after-run mode will be described hereinafter. If the engine stop signal for an idle stop is received from the SCU 103 in the normal mode, the ECU 111 changes the engine control mode from the normal mode to the after-run mode even if an ignition key is maintained in an on position.

In addition, in the case that the ignition key is turned to an off position while the engine control mode is the normal mode, the engine control mode is also changed to the after-run mode. In this case, the engine 109 is not immediately stopped (that is, the ECU does not immediately shut off a power supply to the engine), but the engine 109 is stopped after an engine trouble check and diagnosis are performed for several seconds.

In the case that the engine control mode has been changed from the normal mode to the after-run mode by the engine stop signal, the SCU 103 monitors signals received from the switches and sensors 101 during the after-run mode. While doing so, if a restart condition is satisfied, the engine control mode is immediately changed from the after-run mode to the starting mode. The restart condition is determined to be satisfied if the ignition key is turned on in the after-run mode or if the engine stop releasing signal is received from the SCU 103 in the after-run mode.

If the starting of the engine 109 in the starting mode is finished, the engine control mode is changed from the starting mode to the normal mode.

Meanwhile, in the normal mode, if the engine speed is less than the predetermined speed during a predetermined period and an error code occurs in the ECU 111, the engine control mode is changed from the normal mode to the starting mode.

In addition, as shown in FIG. 2, if the ignition key is turned off in the starting mode, the Engine control mode is changed from the starting mode to the after-run mode.

Figure 3:
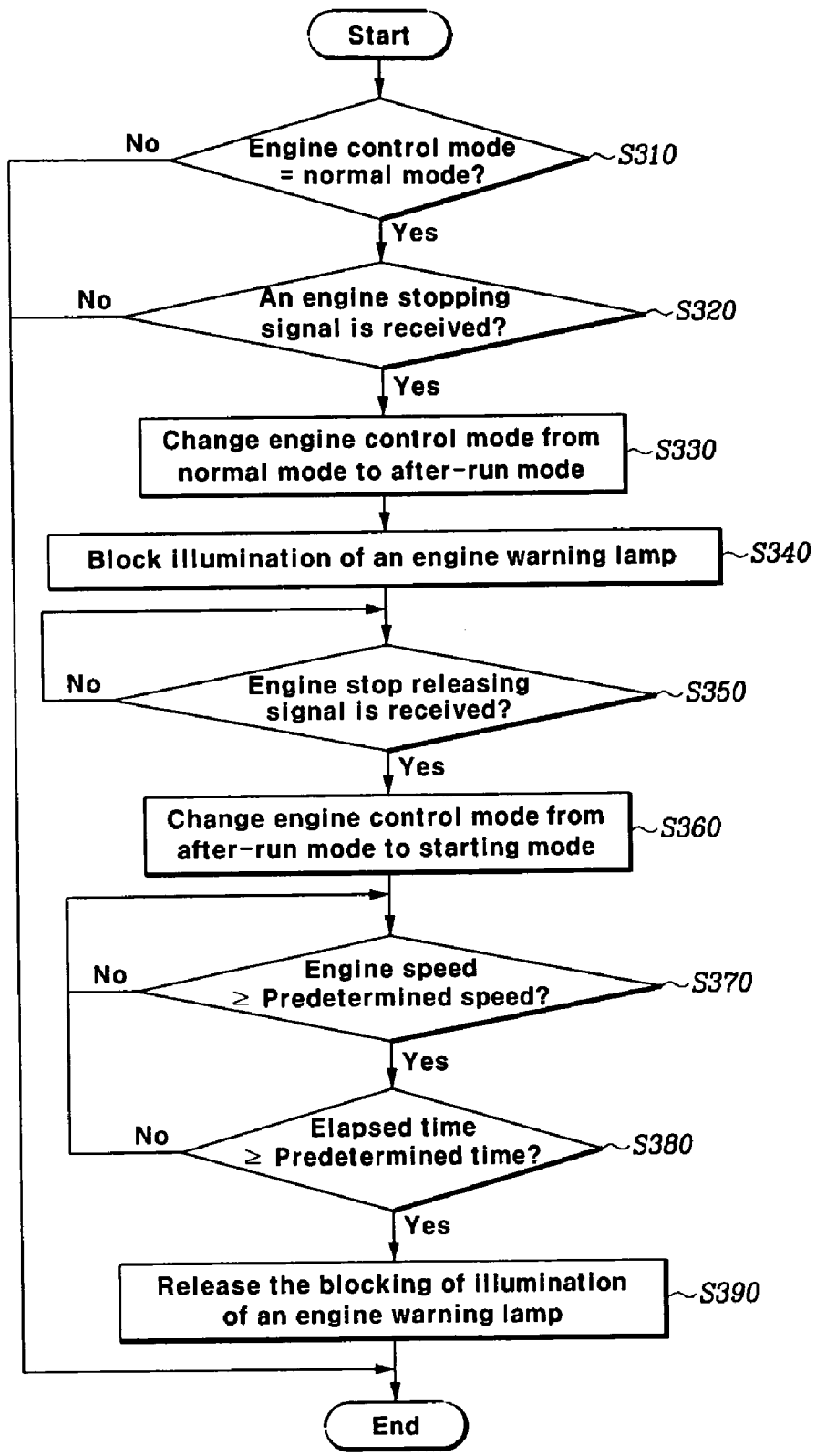
FIG. 3 is a flowchart showing a method for controlling an idle stop-and-go system based on the engine control modes shown in FIG. 2 according to an embodiment of the present invention.

FIG. 3 is a flowchart showing a method for controlling an idle stop-and-go system based on the engine control modes shown in FIG. 2 according to an embodiment of the present invention. As shown in FIG. 3, according to the method for controlling an idle stop-and-go system, firstly, at step S310, the ECU 111 determines whether the present engine control mode is the normal mode. Then, at step S320, the ECU 111 determines whether the engine stop signal is received from the SCU 103.

In the case that the engine stop signal is received when the present engine control mode is the normal mode, the engine control mode is changed from the normal mode to the after-run mode at step S330.

In the case that the engine control mode is changed to the after-run mode at the step S330, the ECU 111 performs a control for blocking an illumination of an engine warning lamp 115. That is, in the case that the engine control mode is changed to the after-run mode by the engine stop signal for the idle stop, an unnecessary illumination of the engine warning lamp is prevented, because the illumination of the engine warning lamp 115 is blocked.

Subsequently at step S350, the ECU 111 determines whether the engine stop releasing signal is received from the SCU 103, and in the case that the engine stop releasing signal is received, the engine control mode is changed at step S360 from the after-run mode to the starting mode.

Subsequently at step S370, the ECU 111 determines whether an engine speed is above a predetermined speed, and in the case that the engine speed is above the predetermined speed, the ECU 111 determines at step S380 whether an elapsed time after the engine speed is above the predetermined speed is above a predetermined time. The predetermined speed is preferably less than a critical speed for changing the engine control mode from the starting mode to the normal mode. For example, the critical speed can be preferably set at 200 rpm and the elapsed time can be preferably set at 3 seconds.

In the case that the elapsed time is above the predetermined time, the ECU 111 releases the blocking of an illumination of the engine warning lamp 115 at step S390.

According to an embodiment of the present invention, an unnecessary illumination of the engine warning lamp is prevented even when the idle stop and the idle stop release are performed repeatedly.

The SCU and ECU can be realized by one or more processors activated by a predetermined program, and the predetermined program can be programmed to perform each step of a method according to an embodiment of this invention.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method for controlling an idle stop-and-go system based on one or more engine control modes including a starting mode wherein an engine control unit (ECU) starts an engine based on an engine stop release signal received from a starter/generator control unit (SCU), a normal mode for normally operating the engine, and an after-run mode wherein the ECU stops the engine based on an engine stop signal received from the SCU, the method comprising:
   determining whether a present engine control mode is the normal mode;
   determining whether an engine stop signal is received from the SCU;
   changing the engine control mode to the after-run mode in the case that the present engine control mode is the normal mode and an engine stop signal is received from the SCU; and
   blocking illumination of an engine warning lamp.

2. The method of claim 1, further comprising:
   determining whether an engine stop releasing signal is received in the after-run mode;
   changing the engine control mode to the starting mode in the case that the engine stop releasing signal is received;
   determining whether an engine speed is above a predetermined speed;
   determining whether an elapsed time after the engine speed became above the predetermined speed is above a predetermined time in the case that the engine speed is above the predetermined speed; and
   releasing the blocking of the illumination of the engine warning lamp in the case that the elapsed time is above the predetermined time.

3. The method of claim 2, wherein the predetermined speed is less than a critical speed for changing the engine control mode from the starting mode to the normal mode.

* * * * *